(12) United States Patent
Kim et al.

(10) Patent No.: US 7,927,734 B2
(45) Date of Patent: Apr. 19, 2011

(54) LITHIUM SECONDARY BATTERY AND FABRICATION METHOD THEREOF

(75) Inventors: Dae-Kyu Kim, Cheonan (KR);
Kwan-Sic Chun, Suwon (KR); Hoon Lim, Suwon (KR)

(73) Assignee: Samsung SDI Co., Ltd., Suwon (KR)

( * ) Notice: Subject to any disclaimer, the term of this patent is extended or adjusted under 35 U.S.C. 154(b) by 1114 days.

(21) Appl. No.: 10/655,298

(22) Filed: Sep. 5, 2003

(65) Prior Publication Data
US 2004/0121229 A1    Jun. 24, 2004

(30) Foreign Application Priority Data
Sep. 5, 2002  (KR) .................. 10-2002-0053458

(51) Int. Cl.
*H01M 2/02* (2006.01)
*H01M 2/08* (2006.01)
(52) U.S. Cl. .................. 429/164; 429/174; 29/623.2
(58) Field of Classification Search .................. 429/164, 429/174
See application file for complete search history.

(56) References Cited

U.S. PATENT DOCUMENTS

| | | | | |
|---|---|---|---|---|
| 5,935,731 | A * | 8/1999 | Nagaura | 429/174 |
| 6,322,921 | B1 * | 11/2001 | Iwaizono et al. | 429/56 |
| 6,322,922 | B1 * | 11/2001 | Yoshio et al. | 429/57 |
| 6,524,739 | B1 * | 2/2003 | Iwaizono et al. | 429/61 |
| 2003/0034758 | A1 * | 2/2003 | Abe | 320/147 |

FOREIGN PATENT DOCUMENTS

| | | | |
|---|---|---|---|
| JP | 06-215747 | | 8/1994 |
| JP | 06215747 | A * | 8/1994 |
| JP | 07-078602 | | 3/1995 |
| JP | 09-092234 | | 4/1997 |
| JP | 09092234 | A * | 4/1997 |
| JP | 09306443 | | 11/1997 |
| JP | 09-326247 | | 12/1997 |
| JP | 09326247 | A * | 12/1997 |
| JP | 2002-175784 | | 6/2002 |
| JP | 2002-231194 | | 8/2002 |
| JP | 2002231194 | A * | 8/2002 |

OTHER PUBLICATIONS

Linden, David, Handbook of Batteries Second Edition, 1995, McGraw-Hil, Inc.,14.18-14.20.*
Linden, David, Handbook of Batteries, 1995, McGraw-Hill, Inc., pp. 14.18-14.20.*

* cited by examiner

*Primary Examiner* — Karie O'Neill Apicella
(74) *Attorney, Agent, or Firm* — H.C. Park & Associates, PLC

(57) ABSTRACT

A lithium secondary battery which includes a battery unit having a positive electrode plate, a negative electrode plate and a separator interposed therebetween. A can accommodates the battery unit, and a reinforcing means is disposed above the can to increase a thickness of the can. A cap assembly is joined to an upper end of the can and the cap assembly has a cap cover and a safety means. The cap assembly is insulated from the can by a gasket.

14 Claims, 4 Drawing Sheets

LITHIUM SECONDARY BATTERY AND FABRICATION METHOD THEREOF

CROSS REFERENCE TO RELATED APPLICATION

This application claims the priority of Korean Patent Application No. 2002-53458, filed Sep. 5, 2002, in the Korean Intellectual Property Office, the disclosure of which is incorporated herein in its entirety by reference.

BACKGROUND OF THE INVENTION

1. Field of the Invention

The present invention relates to a lithium secondary battery, and more particularly, to lithium secondary batteries having improved reinforcing means for increasing the thickness of an upper end of the can connected to a cap assembly.

2. Description of the Related Art

In general, unlike primary batteries which are not rechargeable, secondary batteries are rechargeable. Secondary batteries are widely used in various applications including advanced portable electronic devices such as cellular phones, notebook computers and camcorders. Lithium secondary batteries operating at 3.6 V are rapidly developing because their operating voltage is approximately three-times higher than that of nickel-cadmium (Ni—Cd) batteries or nickel-hydride (Ni-MH) batteries which are widely used as power sources for electronic devices. Lithium secondary batteries also have excellent energy density per unit weight.

A lithium secondary battery generally employs a lithium oxide, as a positive active material, and a carbon material, as a negative active material. Such lithium secondary batteries may be classified as liquid electrolyte cells and polymer electrolyte cells based on the kind of electrolyte used. Lithium batteries using a liquid electrolyte are generally referred to as lithium-ion batteries, and lithium batteries using a polymer electrolyte are generally referred to as lithium-polymer batteries. Typically lithium secondary batteries are manufactured in cylindrical, rectangular and pouchy shapes.

FIG. 1 is a schematic exploded perspective view of a conventional cylindrical lithium secondary battery 10.

Referring to FIG. 1, the cylindrical lithium secondary battery 10 includes a battery unit 11, a cylindrical can 12 accommodating the battery unit 11 and a cap assembly 100 connected to an upper end of the cylindrical can 12.

The battery unit 11 has a positive electrode plate 13, a negative electrode plate 14 and a separator 15. The positive electrode plate 13, the negative electrode plate 14 and the separator 15 are sequentially disposed and wound in a roll, like a jellyroll. A positive electrode lead 16 is attached to the positive electrode plate 13 and a negative electrode lead (not shown) is attached to the negative electrode plate 14. An upper insulating plate 18 is installed in the upper end of the battery unit 11.

The cap assembly 100 includes a cap cover 110, a positive temperature coefficient (PTC) element 130, a safety vent assembly and a gasket 170. The safety vent assembly includes a safety vent 140, an insulating member 150 and a cap plate 160. The safety vent 140, the insulating member 150 and the cap plate 160 are sequentially stacked. The positive electrode lead 16 is electrically connected to the bottom surface of the cap plate 160.

A process of manufacturing the above-described conventional cylindrical lithium secondary battery 10 will now be described briefly.

The battery unit 11 is wound in a roll, like a jellyroll, and inserted into the cylindrical can 12. The upper insulating plate 18 is mounted on the upper surface of the battery unit 11. The can 12 has a beading portion 12a formed by beading. Next, an electrolytic solution is impregnated into the can 12 and the gasket 170 is then inserted into the resultant structure. The gasket 170 is mounted on the top surface of the beading portion 12a. The positive electrode lead 16, which is electrically connected to the positive electrode plate 13 of the battery unit 11, is welded to the bottom surface of the safety vent assembly. The negative electrode lead (not shown) is electrically connected to the negative electrode plate 14 of the battery unit 11 and is electrically connected to the can 12 by a predetermined process. Then, the PTC element 130 and the cap cover 110 are sequentially arranged on the safety vent assembly.

After arrangement of the cap assembly 100 is completed, the cylindrical lithium secondary battery is sealed by a crimping process. Then, a pressing process is carried out in order to maintain the overall height of the battery 10 at a constant level, thereby completing the manufacturing process of lithium secondary battery 10.

During the manufacture of the battery 10, a portion of the can 12 which is disposed above the beading portion 12a is intensely pressed. The pressure causes thermal deformation of the can 12. As a result, the tight seal between the cap assembly 100 and the can 12 is not ensured.

SUMMARY OF THE INVENTION

This invention provides a lithium secondary battery which can substantially prevents deformation of a can during assembly by, for example, increasing a thickness of a portion of the can on which a cap assembly is mounted, and a manufacturing method thereof.

This invention separately provides a lithium secondary battery comprising a battery unit having a positive electrode plate, a negative electrode plate and a separator interposed therebetween to prevent the positive electrode plate from contacting the negative electrode plate. The battery further includes a can, the can accommodating the battery unit, a reinforcing means which is disposed at a portion of the can, for increasing a thickness of the can, and a cap assembly which is joined to an upper end of the can.

This invention separately provides a method of manufacturing a lithium secondary battery comprising winding a battery unit having a positive electrode plate, a separator and a negative electrode plate which are sequentially arranged. The method further includes inserting the battery unit into a can, disposing a ring at an upper end of the can and beading an overlapping portion of the can and the ring. An electrolytic solution is impregnated into the can and a gasket is inserted into an upper portion of the can. The method further includes installing a cap assembly including a cap cover and a safety means on the gasket, and crimping the can so as to seal the cap assembly.

This invention separately provides a battery including a battery unit including a positive electrode plate, a first separator, a negative electrode plate and a second separator, a battery housing unit, wherein the battery unit is housed in the battery unit. The battery further includes a reinforcing member which is provided along a portion of at least one of an outside surface of the battery housing unit and an inside surface of the battery housing unit, and a cap assembly which is joined at an end of the battery housing unit, wherein the battery includes a beading portion at a portion of the battery where the reinforcing member is provided.

BRIEF DESCRIPTION OF THE DRAWINGS

The above aspect and advantages of the present invention will become more apparent by describing in detail preferred embodiments thereof with reference to the attached drawings.

DETAILED DESCRIPTION OF THE INVENTION

Preferred exemplary embodiments of the present invention will now be described in detail with reference to the accompanying drawings.

Figure 1:
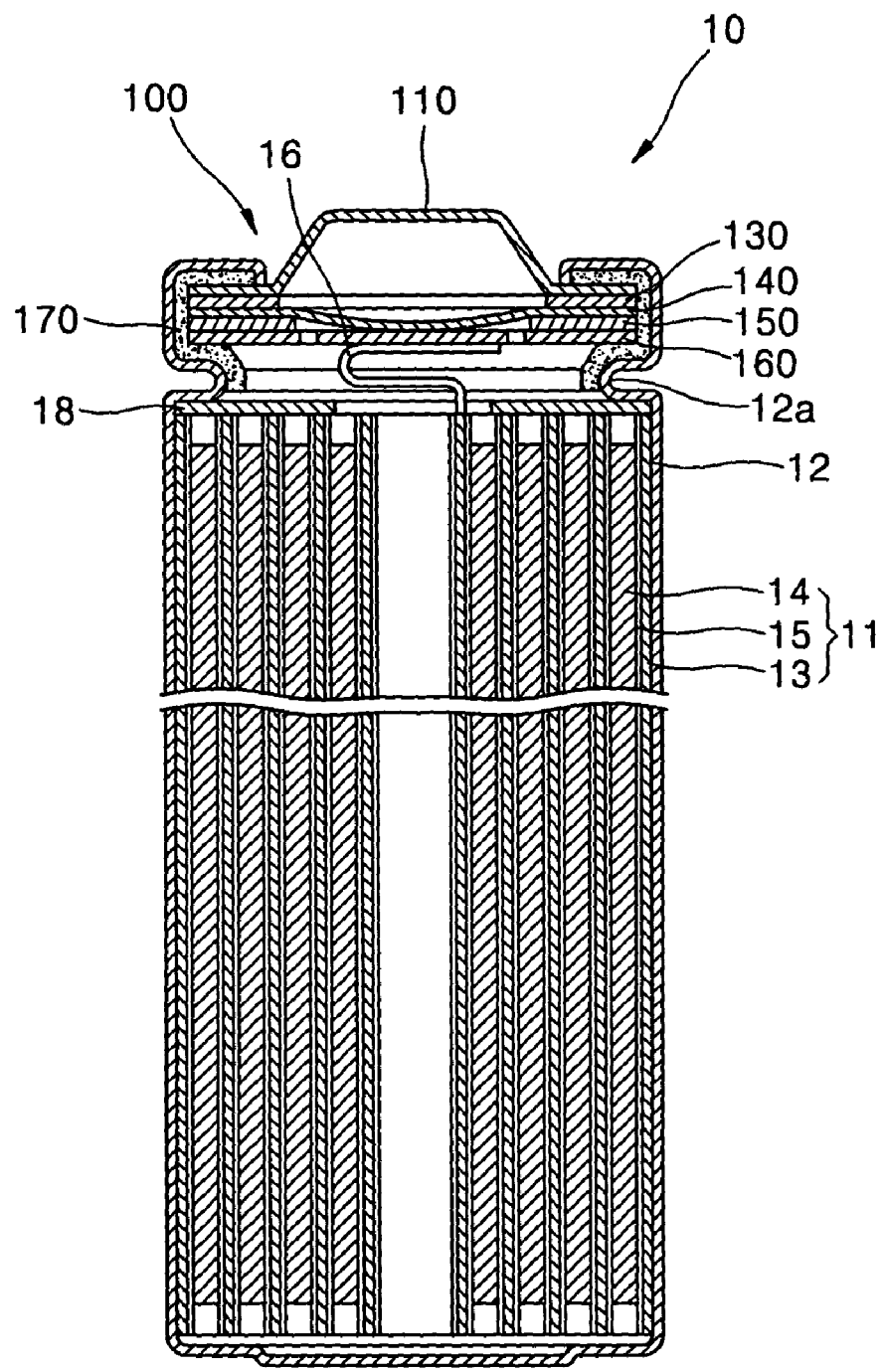
FIG. 1 is a cross-sectional view of a conventional lithium secondary battery.
Figure 2:
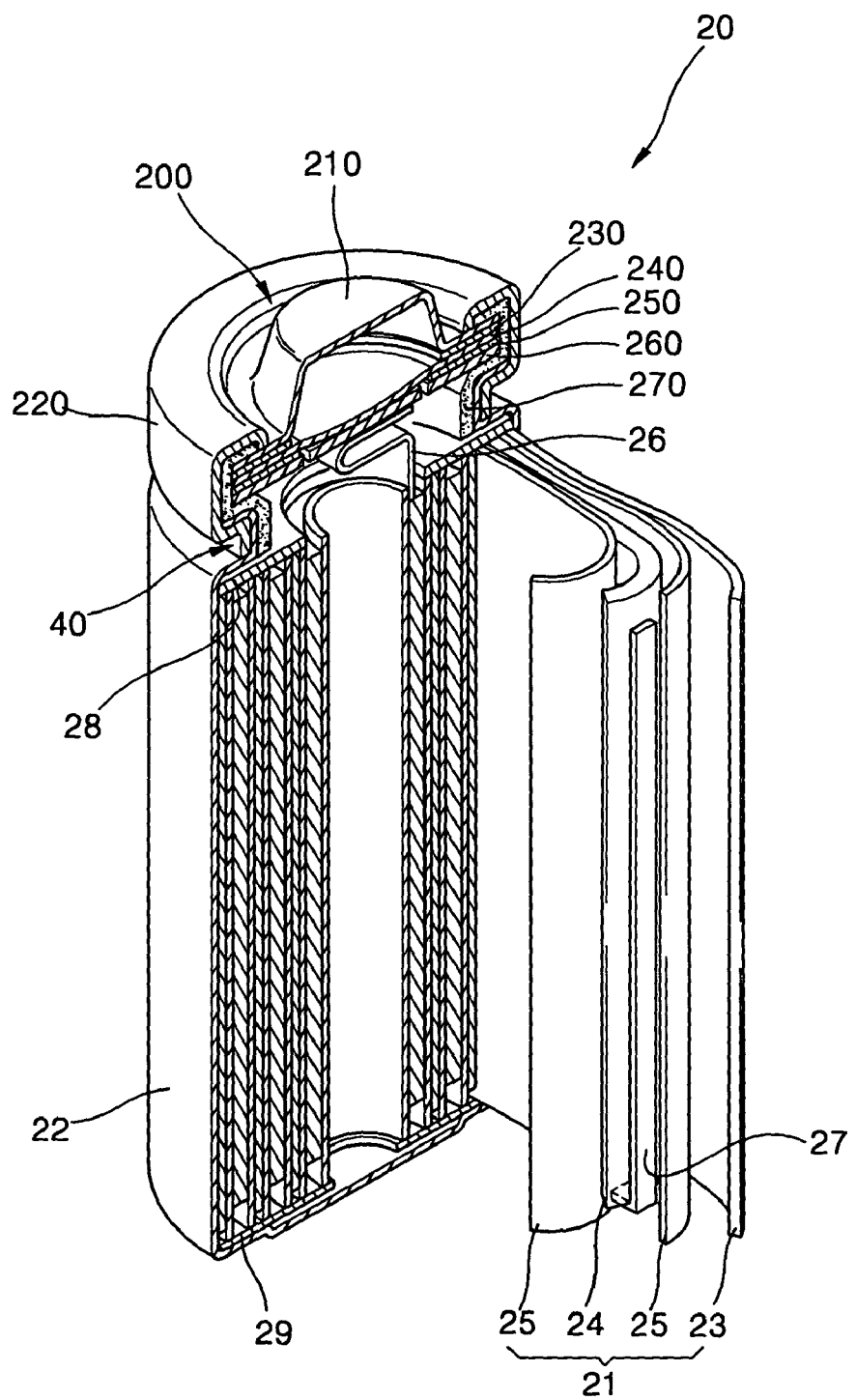
FIG. 2 is an exploded perspective view of a lithium secondary battery according to an embodiment of the present invention.

FIG. 2 is an exploded perspective view of a lithium secondary battery 20 according to an embodiment of this invention. The lithium secondary battery 20 shown in FIG. 2 has a cylindrical shape. However, it should be understood that the principles of this invention may be applied to batteries of various shapes. For example, a cross-section of the lithium secondary battery may be in the shape of a circle, a square, a rectangle, etc.

Referring to FIG. 2, the lithium secondary battery 20 includes a battery unit 21. The battery unit 21 includes a positive electrode plate 23, a negative electrode plate 24 and a separator 25.

The positive electrode plate 23 includes a positive electrode current collector which is made of a sheet or strip-shaped piece of metal foil, e.g., an aluminum foil, and a positive electrode active material layer coated on at least one surface of the positive electrode current collector. For the positive electrode active material layer, a composition including, for example, a lithium oxide as the main component, a positive electrode binder and a positive electrode conductive material may be used. A positive electrode lead 26 is fixed to a surface of the positive electrode plate 23 by welding, for example.

The negative electrode plate 24 includes a negative electrode current collector which is made of a sheet or strip-shaped piece of metal foil, e.g., a copper foil, and a negative electrode active material layer coated on at least one surface of the negative electrode current collector. For the negative electrode active material layer, a composition including, for example, a carbon material as a negative electrode active material, a negative electrode binder and a negative electrode conductive material may be used. A negative electrode lead 27 is electrically connected to a surface of the negative electrode plate 24.

The separator 25 may be made, for example, of a porous insulating material, such as, polyethylene, polypropylene or a composite film of these compounds.

An electrolytic solution used in this invention may include a lithium salt, e.g., $LiPF_6$, a mixed solvent, e.g., a solvent consisting of EC, DMC, MEC and PC mixed in an appropriate proportion.

As shown in FIG. 2, the battery unit 21 is configured such that the positive electrode plate 23, the negative electrode plate 24 and two sheets of separators 25 interposed therebetween are arranged and wound in a roll, like a jelly-roll. An upper end of the positive electrode lead 26 protrudes upward with respect to the battery unit 21, and a bottom end of the negative electrode lead 27 protrudes downward with respect to the battery unit 21. The battery unit 21 is housed inside a can 22.

The overall outer shape of the can 22 conforms to that of the battery unit 21, and the can 22 is made, for example, of hollow, cylindrical metal material. The can 22 itself is electrically connected to an electrode terminal, e.g., the negative electrode plate 24 having the negative electrode lead 27 exposed downward, thereby serving as a negative electrode terminal. An upper insulating plate 28 is disposed on the top surface of the battery unit 21 housed inside the can 22.

A cap assembly 200 is installed at the upper portion of the battery unit 21. A cap cover 210 is provided at the cap assembly 200. The cap cover 210 is electrically connected to another electrode terminal having a polarity opposite to that of the can 22, e.g., the positive electrode plate 23 having the positive electrode lead 26 exposed upward, thereby serving as a positive electrode terminal.

A PTC element 230 is installed under the cap cover 210. An electrical resistance of the PTC element 230 is substantially increased if the temperature exceeds a predetermined level. Thus, when the battery 20 is exposed to an abnormally high temperature charge/discharge current can be interrupted by installing the PTC element 230 inside the cap assembly 200. The PTC element 230 operates reversibly so that current interruption resulting from the operation of the PTC element 230 decreases the temperature of the battery 20 to reduce the electrical resistance, thereby allowing the battery 20 to function properly. The PTC element 230 is set such that the electrical resistance thereof significantly increases at approximately 100° C., for example.

A safety vent assembly is installed under the PTC element 230. The safety vent assembly includes a safety vent 240, and an insulating member 250 and a cap plate 260 sequentially stacked beneath the safety vent 240. The positive electrode lead 26, led from the battery unit 21, is welded to the bottom surface of the cap plate 260. The safety vent assembly is inverted upward when the internal pressure of the battery 20 increases to disconnect the cap plate 260 from the positive electrode lead 26, thereby interrupting charge current. In addition, separate safety means for preventing over-charge, over-discharge or abnormal current flow may be further installed inside the cylindrical lithium secondary battery 20.

A gasket 270 is disposed at the outer surface of the cap assembly 200 and the cap assembly includes the cap cover 210, the PTC element 230 and the safety vent assembly, which are sequentially stacked. The gasket 270 is made of an insulating material. Thus, the cap assembly 200 can be insulated from the can 22 at least via the gasket 270.

Figure 3:
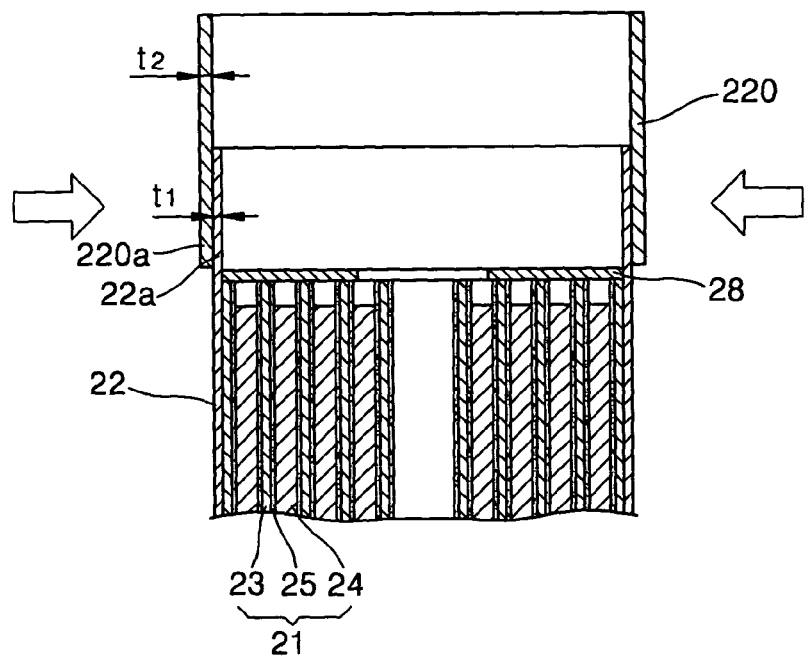
FIG. 3 is a cross-sectional view illustrating the state before the lithium secondary battery shown in FIG. 2 is subjected to a beading process.

In order to prevent deformation of the can 22 during assembly of the battery 20, as described below, a reinforcing means is installed at the upper end of the can 22 where the cap assembly 200 is housed. It should be understood that although the reinforcing means illustrated in FIG. 3 is installed around the outer surface of the can 22, the reinforcing means may be provided along an inner surface of the can 22. It should also be understood that the reinforcing means may be made, for example, of the same material as the can or any other suitable known material. For example, the reinforcing means may be made of a metal.

Figure 4:
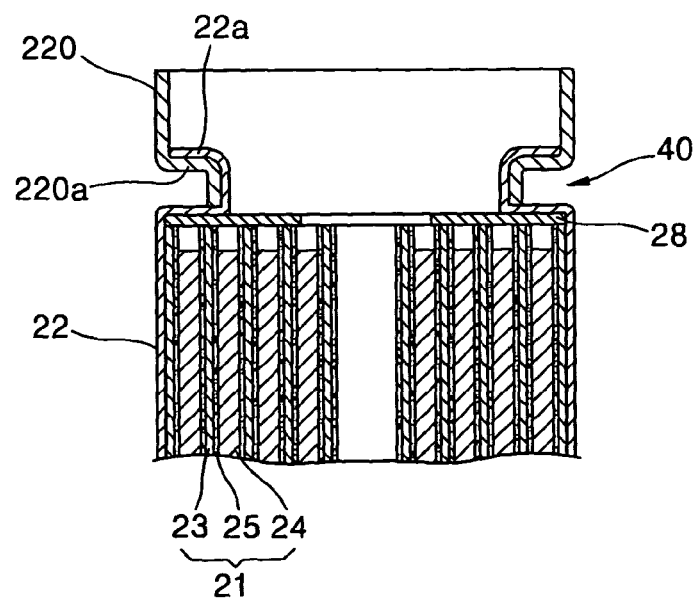
FIG. 4 is a cross-sectional view illustrating the state after the lithium secondary battery shown in FIG. 2 is subjected to a beading process.

FIG. 3 is a cross-sectional view illustrating the state of the lithium secondary battery, shown in FIG. 2, before the battery is subjected to a beading process, and FIG. 4 is a cross-sectional view illustrating the state of the lithium secondary battery, shown in FIG. 2, after the battery is subjected to a beading process. The same reference numerals used in FIG. 2 are used to denote the same functional elements in FIGS. 3 and 4.

Referring to FIGS. 3 and 4, a ring 220 is arranged at the upper end of the can 22. The diameter of the ring 220 is larger than that of the can 22. Accordingly, when the ring 220 is joined to the can 22, an upper end 22a of the can 22 can be fitted to a lower end 220a of the ring 220. The ring 220 may be fitted with the can 22 while maintaining a tolerance in which the outer surface of the can 22 is fitted with the inner surface of the ring 220. Also, the ring 220 has a height sufficient to accommodate the gasket 270 surrounding the outer surface of the cap assembly 200.

Therefore, the thickness of a portion of the can 22 where the cap assembly (200 of FIG. 2) is installed is greater than that of a portion of the can 22 where the battery unit 21 is accommodated by a thickness of the ring 220.

As shown in FIG. 3, the thickness t2 of the ring 220 is different from the thickness t1 of the can 22. In other words, in order to prevent deformation of the can 22 due to external pressure during assembly of the battery 20, the thickness t2 of the ring 220 is made to be greater than the thickness t1 of the can 22.

The lower end 220a of the ring 220 and the upper end 22a of the can 22 overlap each other at the upper portion of the battery unit 21. At least a portion of the overlapping portion is bent inward with respect to the can 22 from the outer surface of the can 22 during the beading process. Accordingly, at least a portion of the overlapping portion of the lower end 220a of the ring 220 and the upper end 22a of the can 22 form a beading portion 40.

The beading portion 40 is formed by bending the lower end 220a of the ring 220 inward with respect to the can 22. Accordingly, a portion of the outer surface of the upper end 22a of the can 22 and the inner surface of the lower end 220a of the ring 220 which are in contact with each other are simultaneously bent. The bottom surface of the gasket 270 surrounding the outer surface of the cap assembly 200 can be seated on the top surface of the beading portion 40. The outer surface of the gasket 270 surface-contacts at least a portion of the inner surface of the can 22.

A process for forming the lithium secondary battery 20 having the above-described configuration will now be described.

A positive electrode plate 23, a negative electrode plate 24 and two sheets of separators 25 are provided. The separators are made, for example, of a sheet or strip-shaped piece of insulating material. A positive electrode lead 26 is fixed to one surface of the positive electrode plate 23 by welding, for example. A negative electrode lead 27 is fixed to one surface of the negative electrode plate 24. An end of the positive electrode lead 26 protrudes upward and an end of the negative electrode lead 27 protrudes downward. The separators 25 are interposed in an alternating fashion between the positive electrode plate 23 and the negative electrode plate 24 for the purpose of preventing short-circuiting therebetween, and the resulting structure is wound in a roll, like a jelly-roll.

A lower insulating plate 29 is disposed on the bottom surface of the resulting battery unit 21, and the negative electrode lead 27 led from the negative electrode plate 24 is bent to provide a surface to connect the negative electrode plate 24 with the can 22. The lower insulating plate 29 is installed for the purpose of preventing short-circuiting of the battery 20.

The battery unit 21 is placed inside the can 22 and the negative electrode lead 27 is resistance-welded, for example, to the bottom plane of the can 22. Accordingly, the can 22 serves as a negative electrode terminal of the battery 20.

After the battery unit 21 is placed inside the can 22, the upper insulating plate 28 is positioned at the upper portion of the battery unit 21. Next, the ring 220 is inserted over the upper end of the can 22. As the diameter of the ring 220 is greater than that of the can 22, the ring 220 fits around the can 22. The inner surface of the ring 220 may be in close contact with the outer surface of the can 22 in the region of the can 22, which is overlapped by the ring 220.

In the embodiment of this invention where the ring 220 fits within the can 22, the diameter of the can 22 is greater than the diameter of the ring 220. In this case, the outer surface of the ring 220 may be in close contact with the inner surface of the can 22. In addition, in embodiments of this invention where the battery is in the shape of a polygon, it should be understood that the length and width of the ring are respectively greater than the length and width of the can in the case where the ring overlaps the outer surface of the can. In the case where the ring sits inside the can, the length and width of the ring are respectively smaller than the length and width of the can.

After the lower end 220a of the ring 220 is in a state where the lower end 220a of the ring 220 overlaps the upper end 22a of the can 22, a beading process is performed. The beading process is performed for to help reduce movement of the battery unit 21 inside the can 22 and to allow the cap assembly 200 to be easily seated on the upper end 22a of the can 22.

At least a portion of the overlapping portion of the can 22 and the ring 220 corresponds to the beading portion 40. The beading portion 40 provides a mounting portion having a predetermined width which is established by bending the overlapping portion inward with respect to the can 22 by applying a predetermined pressure from the outer surface of the can 22.

In a state in which the outer surface of the upper end 22a of the can 22 contacts the inner surface of the lower end 220a of the ring 220, the contacted portion is bent inward with respect to the can 22, thereby preventing deviation of the ring 220 from the can 22.

Next, a predetermined amount of an electrolytic solution is impregnated into the can 22 in a state in which the internal pressure of the can 22 is maintained at a level which is lower than the atmospheric pressure.

After impregnating the electrolytic solution, the gasket 270 is seated on the beading portion 40. The gasket 270 allows the can 22 which is serving as a negative electrode of the battery 20 and the cap assembly 200 which is serving as a positive electrode of the battery 20 to be insulated from one another. Also, the gasket 270 substantially prevents gas generated from the inside of the can 22 and the electrolytic solution from leaking outside.

Then, the positive electrode lead 26 which is led from the positive electrode 23, is welded to the bottom surface of the cap plate 260. Further, the safety vent assembly including the cap plate 260 is installed on the gasket 270. Next, the PTC element 230 and the cap cover 210 are sequentially stacked on the safety vent assembly.

After arrangement of the cap assembly 200 is completed, in order to seal the battery 20 accommodating the safety vent assembly, the PTC element 230 and the cap cover 210, a crimping process for pressing the can 22 having the ring 220 is performed. Thus, in a state in which the cap assembly 200 is surrounded by the gasket 270, the gasket 270 seals the cap assembly 200 from the can 22.

Then, the lithium secondary battery 20 is pressed by a pressing process so as to maintain its height at a constant level, followed by washing to remove foreign matter, from the lithium secondary battery 20.

Figure 5:
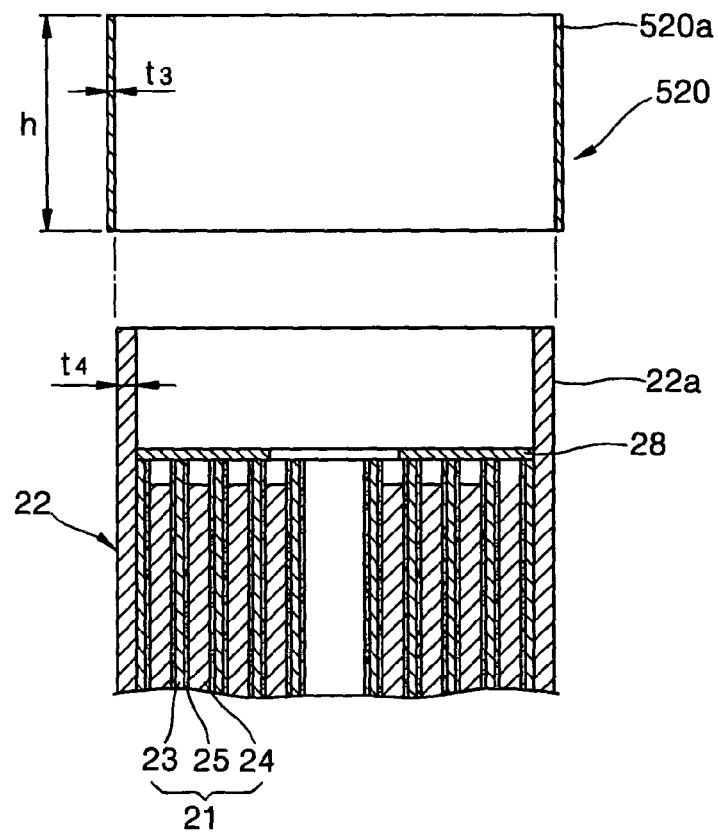
FIG. 5 is an exploded perspective view of a lithium secondary battery according to another embodiment of this invention.
Figure 6:
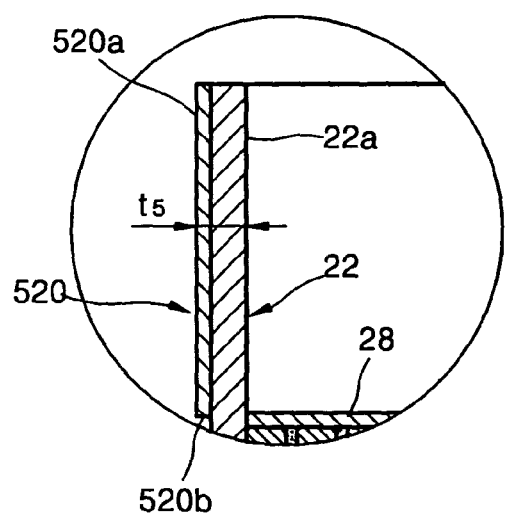
FIG. 6 is a partially enlarged view of an upper portion of the lithium secondary battery shown in FIG. 5.

FIG. 5 is an exploded perspective view of a lithium secondary battery according to another embodiment of this invention, and FIG. 6 is a partially enlarged view of an upper portion of the lithium secondary battery shown in FIG. 5. Only characteristic parts of this embodiment will now be described.

Referring to FIGS. 5 and 6, a ring 520 is disposed at the upper end of the can 22.

The diameter of the ring 520 is greater than that of the can 22. Accordingly, when the ring 520 is joined to the can 22, the inner surface of the ring 520 contacts the outer surface of the can 22. Also, the ring 520 has a height sufficient to accommodate the cap assembly (200 of FIG. 2).

The ring 520 may be substantially completely accommodated in the upper end 22a of the can 22 in order to prevent deformation of the upper end 22a of the can 22 during the crimping process of the battery 20. In other words, the ring 520 may be fitted to the can 22 so that the outer surface of the can 22 contacts the inner surface of the ring 520 and an upper end 520a of the ring 520 is substantially coplanar with the upper end 22a of the can 22. At least a portion of the upper end 520a of the ring 520 and at least a portion of the upper end 22a of the can 22 are both crimped at the overlapping portion thereof.

The thickness of a portion of the can 22 where the cap assembly 200 is installed is greater than the thickness of a portion of the can 22 where the battery unit 21 is accommodated by a thickness of the ring 520.

The thickness t3 of the ring 520 is different from the thickness t4 of the can 22. To prevent deformation of the can 22 during crimping or pressing of the battery 20, the thickness of a portion of the can 22 where the cap assembly 200 is installed is increased.

The thickness t3 of the ring 520 may be smaller than the thickness t4 of the can 22, to prevent the overall thickness of the can 22 from increasing excessively.

For example, the thickness t4 of the can 22 may be 0.2 mm and the thickness t3 of the ring 520 may be 0.05 mm. Thus, the overall thickness t5 of a portion of the can 22 where the cap assembly 200 is installed equals the sum of the thickness t3 of the ring 520 and the thickness t4 of the can 22, that is, 0.25 mm. Thus, the thickness of a portion of the can 22 where the cap assembly 200 is installed is greater than the thickness of the can 22 where the battery unit 21 is accommodated by 0.05 mm, for example, corresponding to the thickness of the ring 520.

As described above, the minimum thickness of a portion of the can 22 where the ring 520 is installed corresponds to a thickness in which there is substantially no thermal deformation due to external pressure applied during crimping. Since the size of the can 22 is increased as the volume of the battery unit 21 accommodated inside the can 22 increases, the thickness of the ring 520 can be set according to the pressure applied to the can 22 at the region where the ring 520 is installed. However, the can 22 can maintain a minimum thickness enough to substantially maintain the battery through installation of the ring 520.

In order to prevent a lower end 520b of the ring 520 from easily separating from the can 22, a beading portion is formed at the overlapping portion of the can 22 and the ring 520. The beading portion is bent inward with respect to the can 22 from the outer surface thereof during the beading process.

In the various embodiments of a lithium secondary battery according to this invention, a thickness of a portion where a cap assembly is installed is increased and both a can accommodating a battery unit and a ring installed at an upper end of the can are subjected to a beading process. Accordingly, deformation of the can due to external pressure applied during crimping or pressing can be prevented.

In various embodiments according to this invention, because the cap assembly is sealed in a state in which the thickness of the can where the cap assembly is installed is greater than the thickness of the can where the battery unit is accommodated, inferiority of a battery due to external pressure applied during assembling the battery can be reduced.

In various embodiments according to this invention, because the strength of the can where the cap assembly is installed is increased, the cap assembly can be firmly fixed.

While this invention has been particularly shown and described with reference to preferred exemplary embodiments thereof, it will be understood by those of ordinary skill in the art that various changes in form and details may be made therein without departing from the spirit and scope of the present invention as defined by the following claims.

What is claimed is:

1. A lithium secondary battery, comprising:
    a battery unit having a positive electrode plate, a negative electrode plate and a separator interposed therebetween to prevent the positive electrode plate from contacting the negative electrode plate;
    an upper insulating plate arranged on the battery unit;
    a can, the can accommodating the battery unit;
    reinforcing means disposed at a portion of the can, for increasing a thickness of the can; and
    a cap assembly joined to an upper end of the can,
    wherein the reinforcing means is a single hole surrounded by a solid ring that fits around the upper end of the can;
    wherein at least a portion of the ring is fitted with at least a portion of the can, forming an overlapping portion;
    wherein the overlapping portion has a beading portion, the beading portion being at least a portion of the overlapping portion where the ring and the can are bent inward with respect to a portion of the can which is not overlapped by the ring;
    wherein one end of the can and one end of the ring terminate at the beading portion,
    wherein the upper insulation plate contacts the can at a lower end of the beading portion, and
    wherein the cap assembly comprises a gasket contacting the can at an upper end of the beading portion.

2. The lithium secondary battery of claim 1, wherein the can is cylindrical.

3. The lithium secondary battery of claim 1, wherein the cap assembly further comprises a cap cover and a safety means.

4. The lithium secondary battery of claim 1, wherein the gasket is disposed on a surface of the beading portion.

5. The lithium secondary battery of claim 1, wherein a diameter of the ring is greater than a diameter of the can.

6. The lithium secondary battery of claim 1, wherein a thickness of the ring is greater than a thickness of the can.

7. The lithium secondary battery of claim 1, wherein a thickness of the ring is smaller than a thickness of the can.

8. The lithium secondary battery of claim 1, wherein a minimum thickness of the portion of the can where the ring is installed corresponds to a thickness which substantially prevents thermal deformation due to external pressure applied during crimping.

9. The lithium secondary battery of claim 1, wherein the ring has a height sufficient to accommodate the gasket surrounding an outer surface of the cap assembly.

10. The lithium secondary battery of claim 1, wherein a cross section of the can is at least one of round, oval, square, rectangular, and cylindrical.

11. The lithium secondary battery of claim 10, wherein the ring is at least one of round, oval, square, and rectangular.

12. A battery, comprising:
   a battery unit including a positive electrode plate, a first separator, a negative electrode plate and a second separator;
   an upper insulating plate arranged on the battery unit;
   a battery housing unit, wherein the battery unit is housed in the battery housing unit;
   a reinforcing member provided along a portion of at least one of an outside surface of the battery housing unit and an inside surface of the battery housing unit; and
   a cap assembly joined at an end of the battery housing unit, wherein the battery includes a beading portion at a portion of the battery where the reinforcing member is provided,
   wherein one end of the battery housing unit and one end of the reinforcing member terminate at the beading portion,
   wherein the upper insulation plate contacts the battery housing unit at a lower end of the beading portion,
   wherein the reinforcing member is a single hole surrounded by a solid ring, and
   wherein the cap assembly comprises a gasket contacting the battery housing unit at an upper end of the beading portion.

13. The lithium secondary battery of claim 1, wherein an upper end of the can is substantially coplanar to an upper end of the ring.

14. The lithium secondary battery of claim 12, wherein an upper end of the battery housing unit is substantially coplanar to an upper end of the reinforcing member.

* * * * *